United States Patent
Bukala

(10) Patent No.: US 8,685,157 B2
(45) Date of Patent: Apr. 1, 2014

(54) COMPOSITION AND METHOD FOR STABILIZING ENVIRONMENTALLY-HARMFUL SUBSTANCES; USE OF NON-FERROUS METAL SALTS AND OXIDES TO STABILIZE ENVIRONMENTALLY-HARMFUL SUBSTANCES WITH CAUSTIC MAGNESIUM OXIDE

(75) Inventor: Emilia Bukala, Poznan (PL)

(73) Assignee: Ecotech Polska SP. Z O.O., Lomianki (PL)

( * ) Notice: Subject to any disclaimer, the term of this patent is extended or adjusted under 35 U.S.C. 154(b) by 450 days.

(21) Appl. No.: 12/551,935

(22) Filed: Sep. 1, 2009

(65) Prior Publication Data

US 2010/0217062 A1 Aug. 26, 2010

(30) Foreign Application Priority Data

Feb. 24, 2009 (EP) .................................... 09461501

(51) Int. Cl.
| | | |
|---|---|---|
| *C01F 5/02* | (2006.01) | |
| *A62D 3/33* | (2007.01) | |
| *C04B 28/30* | (2006.01) | |
| *C01D 1/02* | (2006.01) | |
| *B01J 20/04* | (2006.01) | |

(52) U.S. Cl.
USPC ........... 106/800; 106/690; 106/792; 106/801; 588/315; 588/413; 502/400; 502/415

(58) Field of Classification Search
USPC .......... 423/592.1–597, 600, 594.16; 588/313, 588/315, 318, 320, 400, 404, 405–408, 410, 588/412, 415; 502/415; 106/286.8, 287.18, 106/287.17
See application file for complete search history.

(56) References Cited

U.S. PATENT DOCUMENTS

| 5,135,756 | A * | 8/1992 | Shi et al. .......................... 502/62 |
|---|---|---|---|
| 2003/0041785 | A1 * | 3/2003 | Harrison ........................ 106/801 |
| 2005/0103235 | A1 * | 5/2005 | Harrison ........................ 106/801 |
| 2008/0146860 | A1 * | 6/2008 | Doumbos et al. ............. 588/252 |
| 2009/0118564 | A1 * | 5/2009 | McCullough et al. ........ 588/315 |

FOREIGN PATENT DOCUMENTS

| FR | 1 062 485 | 4/1954 |
|---|---|---|
| WO | WO 92/18437 | 10/1992 |
| WO | WO 98/54107 | 12/1998 |
| WO | WO 03/093190 | 11/2003 |

OTHER PUBLICATIONS

International EP Search Report; EP 09 46 1501; M. Burton; Jul. 24, 2009.

* cited by examiner

*Primary Examiner* — Steven Bos
*Assistant Examiner* — Justin Bova
(74) *Attorney, Agent, or Firm* — Matthias Scholl, PC; Matthias Scholl

(57) ABSTRACT

A composition for binding environmentally-harmful substances in solid or semi-liquid state contains caustic magnesium oxide, non-ferrous metal salts as a hardener, non-ferrous metal oxides catalyzing formation of radial crystalline structures, and optionally water and other additives. A method of stabilization of environmentally-harmful substances binds these substances in the solid state or semi-liquid state in the composition containing caustic magnesium oxide, wherein the environmentally-harmful substances are supplemented by the composition containing caustic magnesium oxide, non-ferrous metal salts as hardener, non-ferrous metal oxides catalyzing formation of radial crystalline structures, and optionally water and other additives. A form of paste is obtained, followed by leaving the mixture for solidification and stabilization of the product. Use of non-ferrous metal salts in connection with non-ferrous metal oxides catalyzing formation of radial crystalline structures stabilizes the environmentally-harmful substance with the use of caustic magnesium oxide.

1 Claim, No Drawings

COMPOSITION AND METHOD FOR STABILIZING ENVIRONMENTALLY-HARMFUL SUBSTANCES; USE OF NON-FERROUS METAL SALTS AND OXIDES TO STABILIZE ENVIRONMENTALLY-HARMFUL SUBSTANCES WITH CAUSTIC MAGNESIUM OXIDE

CROSS-REFERENCE TO RELATED APPLICATIONS

This application claims priority to European Application Serial No. EP 09461501, filed on Feb. 24, 2009 which is incorporated by reference in its entirety.

TECHNICAL FIELD

The present invention relates to composition and method used for stabilization of environmentally-harmful substances with caustic magnesium oxide, which assure increased durability of the final material due to formation of desired permanent crystalline structures. Additionally, the present invention involves application of non-ferrous metal salts and oxides to stabilize environmentally-harmful substances with the use of caustic magnesium oxide.

BACKGROUND

Most detrimental substances, which contain e.g. heavy metals, are deposited on landfills in an unprocessed condition, which is hazardous for the environment. Hence the demand for efficient methods of processing and immobilization of such materials is very strong.

The immobilization of detrimental substances is effected primarily by a chemical transformation of these substances, which will stop them from being washed out in the form of dissolved solids, and if possible, by changing some of their physical parameters, so as to improve the mechanical durability of the product and decrease its water permeability.

The most popular method of stabilization of detrimental substances consists in mixing them with cement. Solidification using only cement produces merely the "outer barrier" resulting from morphology of crystals which create a physical structure. Migration is stopped as a result of fixation of waste in the bulk of cement, reduced permeability and increased density of the mixture. The drawbacks for solidification using only the cement are: the huge growth of volume (and mass) of the mixture as a result of large amounts of cement added, limited durability of the solid phase, and large porosity. Crystal build-up while the cement is added results from reaction of four significant components of cement. Hydration is caused by: tricalcium silicate (20-60%), dicalcium silicate (20-30%), tricalcium aluminate (5-10%) and tetra-calcium aluminoferrite (8-15%). Adding water leads to emergence of calcium hydroxide $Ca(OH)_2$ and, consequently, the crystals. As the reaction takes place quickly, the resulting material is porous and therefore water-permeable. When water permeates through pores in the presence of acid rains and $CO_2$, the change of pH caused by free $Ca(OH)_2$ is restrained only in the initial phase. After some time the leaching of heavy metals resumes and permissible levels of these metals in water extract are exceeded. The period of full immobilization for cement is assumed at 2 to 3 years, depending on the quantity and quality of the cement used and atmospheric conditions.

In view of the above, many attempts are being made to discover a cost-efficient and productive way to permanently stabilize the hazardous substances.

Another preferable additive is sulphuric acid or magnesium sulphate or aluminium sulphate. Additives such as organic acids or sulphuric acid ensure that what is actually fixated, is a particular compound of the waste material, rather than the entire mixture. However in consequence, the resulting product fails to meet the limit values of parameters specified by environmental legislation, which is required to assume that the product has been neutralized effectively. This applies, in particular, to contents of sulphates or solid-state soluble substances. As a result the final product may be deposited only on a waste landfill. Additionally, this method fails to ensure the control over the reactions taking place during binding, which is a prerequisite for the efficient fixation of hazardous substances and compounds.

None of the methods of fixation of detrimental waste in use today ensure durability and stability of the resultant product, allowing it to be safely used.

SUMMARY

The present disclosure describes a composition for binding the environmentally-harmful substances in solid or semi-liquid phase, which contains caustic magnesium oxide, nonferrous metal salts as hardeners, non-ferrous metal oxides catalyzing formation of radial crystalline structures, and optionally water and other additives.

Preferably, the composition contains:
 10-150% by weight of caustic magnesium oxide, with regard to the mass of detrimental substances,
 1-60% by weight with regard to the mass of magnesium oxide, of non-ferrous metal salts as the hardener, and
 0.5-8% by weight with regard to the mass of magnesium oxide, of non-ferrous metal salts catalyzing formation of radial crystalline structures, and
 water in such quantity which ensures the consistence of a paste.

The applied caustic magnesium oxide contains more than 70%, and preferably more than 90% of magnesium oxide.

The used non-ferrous metal salt is preferably selected among magnesium chloride, aluminium chloride, sodium hydrogen sulphate, sodium pyrophosphate, sodium carbonate, aluminium silicate, sodium aluminate, aluminium alcoholate, tri-calcium silicate, sodium silicate, pentahydrous sodium metasilicate, magnesium silicate, potassium silicate, magnesium phosphate, calcium hydrogen phosphate, superphosphate. Whereas, the non-ferrous metal oxides are selected among: calcium oxide, potassium oxide and aluminium oxide.

This composition may also contain pearlite, cryolite or bauxite as an additive.

The disclosure also describes a method for stabilizing environmentally-harmful substances by binding these substances in the solid or semi-liquid form in a composition containing caustic magnesium oxide, in which the environmentally-harmful substances are supplemented with the composition containing caustic magnesium oxide and optionally other additives, non-ferrous metal salts as hardener and non-ferrous metal oxides catalyzing formation of radial crystalline structures, optionally with water; a paste-like consistence is obtained; and then the resulting mixture is left for solidification and stabilization of the product. The process performance is good in the atmospheric air in the ambient temperature of 15-35° C. Solidification usually takes up to 2 days, while stabilization of the mixture, to ensure its resistance to washing out of detrimental substances, takes up to 14 days.

Preferably, the environmentally-harmful substances are supplemented by the composition containing caustic magnesium oxide in quantity of 10-150% by weight with regard to the quantity of environmentally-harmful substances, non-ferrous metal salts in quantity of 1-60% by weight with regard to the mass of magnesium oxide, nonferrous metal oxides catalyzing formation of appropriate crystalline structures, in quantity of 0.5-8% by weight with regard to the mass of magnesium oxide, and water.

The method uses caustic magnesium oxide containing more than 70%, or even 90% of magnesium oxide.

The used non-ferrous metal salt is preferably selected among: magnesium chloride, aluminium chloride, sodium hydrogen sulphate, sodium pyrophosphate, sodium carbonate, aluminium silicate, sodium aluminate, aluminium alcoholate, tri-calcium silicate, sodium silicate, pentahydrous sodium metasilicate, magnesium silicate, potassium silicate, magnesium phosphate, calcium hydrogen phosphate, superphosphate.

A preferred non-ferrous metal oxide used to catalyze formation of radial crystalline structures is calcium oxide, potassium oxide or aluminium oxide.

The present disclosure includes also application of non-ferrous metal salts together with non-ferrous metal oxides catalyzing formation of radial crystalline structures, in order to stabilize the environmentally-harmful substances with the use of caustic magnesium oxide.

The non-ferrous metal oxide is preferably selected among: calcium oxide, potassium oxide and aluminium oxide.

The environmentally-harmful substance may be a single chemical element or compound, e.g. a salt, or may constitute a mixture of chemical compounds, such as debris, soil, sludge, or ash. The stabilized noxious substances include such elements and compounds as: arsenic, barium, cadmium, chrome, copper, mercury, molybdenum, nickel, lead, antimony, selenium, zinc, chlorides, fluorides, sulphates, polychlorinated biphenyls, polycyclic aromatic hydrocarbons, phenols, benzene, naphthalene, anthracene, pyridine bases, resins, asphaltenes, DDT, cyanides, toluenes, xylenes.

Detrimental substances are stabilized in a process of three-dimensional polymerization of mineral crystalline matrix, inside which the elements and environmentally-harmful substances are immobilized. This process leads to transformation of environmentally-harmful substances into wholly neutral products.

The composition used is based on magnesium oxide, and should preferably contain more than 70% of that oxide. This component ensures high compression strength, resistance to frost and impermeability to water, which allows for further usage of stabilized substances as fillers for concrete or reclamation materials used for grading of areas or formation of landfill bodies.

The non-ferrous metal salts used in the composition ensure early strength of stabilized substances and facilitate production of brucite $Mg(OH)_2$ and its further transformations.

They also increase water impermeability.

The non-ferrous metal oxides ensure formation of desired radial crystalline structures, which are responsible for increased strength and durability of the final product, including resistance to washing out of the bound substances.

Types and Morphology of Hydrated Magnesium Carbonate Crystals

Magnesite and caustic magnesium oxide produced therefrom are characterized by very good workability, however the presence of some admixtures may alter these properties significantly. This susceptibility of carbonized magnesium oxide to changes of properties is used in the present invention. The experiments carried out have demonstrated that additions of acid, alkaline and amphoteric compounds of: non-ferrous metal salts and oxides have a significant impact on the mechanical strength of the mineral matrix emerging as a result of crystallization, and consequently, on the washing out of detrimental substances neutralized using the present invention.

Depending on the ambient conditions, the crystals of $MgCO_3$ form concentrations of crystalline structures emerging in three basic forms: elongated rods, radial structures or grainy structures. The first one of them is $MgCO_3*2H_2O$ (Barringtonite), the second: $MgCO_3*3H_2O$ (Nesquehonite), and the third: $MgCO_3*5H_2O$ (Lansfordite). The above named forms differ in the degree of hydration and the shape of crystals produced during carbonization. This means that each of these forms gives a different input into the final strength of the emerging mineral matrix.

$MgCO_3*2H_2O$ (Barringtonite), as dihydrate crystal, produces rod-like forms. Therefore, the crystals emerging in the waste are characterized by rod-like structures, elongated in one direction. This form of aqueous magnesium carbonate is not desired for neutralization of detrimental substances. This type of crystals, although being a three-dimensional structure, does not "engage" one another to such degree as $MgCO_3*3H_2O$ and does not significantly contribute to increased mechanical strength of the mixture.

The second main form of hydration of magnesium carbonate is $MgCO_3*3H_2O$ (Nesquehonite). The crystals of this hydrate, during their growth, are characterized not only by concentration in the form of elongated rods, but also by formation of arms extending radially. This type of crystals, during growth and crystallisation, shows a natural tendency to mesh. This process obviously results in increased mechanical strength of the binder, in which crystallization takes place. This type of crystals is the most desired of all which can be found in magnesia, and also in the mass of neutralized material.

The third form of hydrated calcium carbonate is $MgCO3*5H_2O$ (Lansfordite). This type of crystals produces grainy concentration spots. This form of hydrated magnesium carbonate is not desired for neutralisation of detrimental substances, as these crystals do not mesh engaging one another and do not contribute to the increase of mechanical strength of the mixture.

Impact of Metal Oxides on Magnesia Binders

As can be seen from the above discussion, the rod-like, radial and grain-like concentration spots are characteristic for hydrated magnesite. The conducted research had shown that introduction of a metal oxide having particular characteristics into the mixture in the state of crystallization leads to formation of $MgCO_3$ crystals in a specific, desired form. Crystallization takes place as a result of the following reactions:

$MgO+H_2O \Longrightarrow Mg(OH)_2$ $Mg(OH)_2+CO_2 \Longrightarrow MgCO_3*5H_2O(lub\ MgCO_3*3H_2O)+H_2O$ Addition of the corresponding nonferrous metal oxides, such as calcium oxide, potassium oxide or aluminium oxide, during crystallisation of the mixture stimulates emergence of crystal forms desired from the viewpoint of contaminant washability and increased strength of crystal forms.

Addition of alkaline $Al_2O_3$ or its crystalline form (corundum) stimulates formation of $MgCO_3*3H_2O$ crystals, i.e. the most desired structures. The mixtures exposed to the effects of a small addition (up to 1.5%) of aluminium oxide demonstrated better mechanical strength and a considerably lower degree of washing out of the detrimental substances from the mixture.

The conducted research showed that the crystallizing mass of waste bound with MgO, supplemented with amphoteric or crystalline aluminium oxide $Al_2O_3$, initiates formation of trihydrate crystals in radial form. This allows the individual crystals to mesh engaging one another. The increase of mechanical strength in this case is of a microstructural nature. This mechanical strength of the produced structure is associated also with resistance to washing out of detrimental substances present in the mixture.

Formation of desired radial crystalline structures, which increase the strength and stimulate the specific cross-linking of the solidification product allows for effective and permanent "capture" of the stabilized detrimental substances being in the solid or semiliquid phase. Both the composition, as well as the method of the invention allow stabilization of various types of waste, such as slag, ash, sludge, leachate, contaminated by i.a. heavy metals such as As, Ba, Cd, Cr, Cu, Hg, Mo, Ni, Pb, Sb, Se, Zn and polycyclic aromatic hydrocarbons, which are usually petroleum derivatives, as well as sulphates, chlorides and other compounds.

Leaching of toxic and detrimental components stabilized as described herein is significantly reduced in comparison with the presently used caustic magnesium oxide without the appropriate additives to the composition. These additives bring two main advantages. The first one consists in improved process performance, allowing effective neutralization of detrimental substances, which is beyond the reach of existing technologies. The second advantage is the possibility to reduce the quantity of additives used as admixtures to the mass of neutralized mixture. This reduces the final mass of required substrates and the solidification product, and consequently—the costs associated with the process, and the subsequent transportation of neutralized substances and solidification products.

The product, which is harmless for the environment, may be later used, instead of being only stored.

EXAMPLE 1

A sample of sludge produced in hydro-metallurgy 250 g, caustic magnesium oxide 37.5 g, sodium hydrogen sulphate 1.9 g, aluminium oxide 0.4 g.

All components were placed in a continuous horizontal single-shaft mixer WAH 00075 (from WAMGROUP holding) having a cylindrical mixing drum with inlet, outlet on the opposite side and de-aeration pipe, with a mixing shaft. Mixing time 60 s.

Fully homogenized material, in the form of a paste hydrated in 20%, was placed in containers sized 200×150×80 mm and left over for 14 days.

Impact of aluminium oxide additive on the properties of a mixture (leaching test) based on an example of neutralization of sludge from hydro-metallurgy processes

| Parameter | Raw material Leaching [mg/kg d.m.] | Caustic MgO Leaching [mg/kg d.m.] | Caustic MgO + 1% $Al_2O_3$ (amphoteric) Leaching [mg/kg d.m.] | Caustic MgO + 1% $Al_2O_3$ (corundum) Leaching [mg/kg d.m.] |
|---|---|---|---|---|
| Cadmium (Cd) | 558.7 | <0.10 | 0.18 | 0.19 |
| Lead (Pb) | 52.52 | 6.95 | 2.2 | 1.29 |
| Zinc (Zn) | 31927 | <0.50 | <0.50 | <0.50 |
| Sulphates ($SO_4^{2-}$) | 79647 | 23280 | 13550 | 15080 |
| Dissolved solid-state compounds | 118040 | 40600 | 25250 | 23850 |

An analysis of the above data shows a significantly more efficient stabilization of detrimental substances. The values associated with leaching of these substances in case when the aluminium oxide additives are used were reduced, as compared to the mixture neutralized without this additive, by:

Lead (Pb)—leaching reduced by 81%
Sulphates ($SO_4^{2-}$)—leaching reduced by 42%
Total Dissolved Solids—leaching reduced by 41%

EXAMPLE 2

Debris contaminated with mercury 500 g, caustic magnesium oxide 150 g, sodium pyrophosphate 7.5 g, calcium oxide 0.8 g, water 500 ml.

All components were processed as per Example 1.

| Parameter | Raw material | Leaching [mg/kg d.m.] Post-process material without calcium oxide added | Post-process material with calcium oxide |
|---|---|---|---|
| Barium (Ba) | 780 | 4.20 | 1.48 |
| Chromium (Cr) | 22 | 1.14 | 0.65 |
| Mercury (Hg) | 54 | <0.005 | <0.005 |
| Arsenic (As) | 4.3 | <0.05 | <0.05 |

The reduction of leaching was increased for:
Barium (Ba)—by 65%
Chromium (Cr)—by 43%

EXAMPLE 3

Mixture of industrial sediments 500 g, caustic magnesium oxide 175 g, sodium metasilicate 10.5 g, aluminium oxide 3.5 g.

All components were processed as per Example 1.

| Parameter | Raw material | Leaching [mg/kg d.m.] Post-process material without aluminium oxide added | Post-process material with aluminium oxide |
|---|---|---|---|
| Zinc (Zn) | 273 | <1.86 | <1.86 |
| Copper (Cu) | 58.1 | <1.52 | <1.52 |

-continued

| | | Leaching [mg/kg d.m.] | |
|---|---|---|---|
| Parameter | Raw material | Post-process material without aluminium oxide added | Post-process material with aluminium oxide |
| Lead (Pb) | 108 | 18.2 | 1.70 |
| Mercury (Hg) | 306 | 9.8 | 0.012 |
| Chromium (Cr) | 24 | <2.79 | <2.79 |

The reduction of leaching was increased for:
Lead (Pb)—by a min. of 91%,
Mercury (Hg)—by 99.9%.

EXAMPLE 4

Material from glazing of ceramic materials 500 g, caustic magnesium oxide 90 g, sodium metasilicate 4.5 g, aluminium oxide 0.5 g, water 200 ml.
All components were processed as per Example 1.

| | | Leaching [mg/kg d.m.] | |
|---|---|---|---|
| Parameter | Raw material | Post-process material without aluminium oxide added | Post-process material with aluminium oxide |
| Barium (Ba) | 311 | 4.09 | 1.45 |
| Lead (Pb) | 152 | 1.93 | <0.30 |

The reduction of leaching was increased for:
Barium (Ba)—by 64.5%;
Lead (Pb)—by a min. of 84.5%.

EXAMPLE 5

Sludge from hydro-metallurgy of zinc 500 g, caustic magnesium oxide 70 g, sodium hydrogen sulphate 3.5 g, aluminium oxide 0.7 g, water 100 ml.
All components were processed as per Example 1.

| | Leaching | |
|---|---|---|
| Parameter | Raw material | Post-process material |
| Zinc (Zn) | 31605 | <0.09 |
| Copper (Cu) | 1.59 | 0.069 |
| Lead (Pb) | 23.81 | <0.2 |
| Cadmium (Cd) | 392 | <0.02 |
| Nickel (Ni) | <4.29 | 0.10 |

Selected parameters representing material strength, post process:

| Determined parameter | Result |
|---|---|
| Water content, % | 0.2 |
| Solubility in water, WS | 7.2 |
| Volume of hollow spaces, V % | 35.6 |
| Susceptibility to water | Not susceptible |
| Bituminous number BN | 38 |

-continued

| Determined parameter | Result |
|---|---|
| Delta ring and ball $\Delta_{RAB}$, ° C. | 26.4 |
| Blaine test S, m²/kg | 879.6 |
| Relative compression strength, S % | 106 |
| Shrinkage when drying, % | 0.004 |
| Light contamination, $m_{LPC}$ % | 0.0 |
| Grains density $\rho_f$ Mg/m³ | 2.67 |
| Dust, % | 11.2 |
| Bulk density in loose condition in kerosene Mg/m³ | 0.571 |

EXAMPLE 6

Arsenic sludge 500 g, caustic magnesium oxide 500 g, potassium silicate 50 g, aluminium oxide 5 g, water 400 ml.
All components were processed as per Example 1.

| | | Leaching [mg/kg d.m.] | |
|---|---|---|---|
| Parameter | Raw material | Post-process material without aluminium oxide added | Post-process material with aluminium oxide |
| Arsenic (As) | 6549 | 473 | 77.37 |
| Chromium (Cr) | 15.18 | <2.79 | <2.79 |
| Iron (Fe) | 904.3 | <1.12 | <1.12 |
| Chlorides (Cl) | 13057 | 98.0 | 56 |

The reduction of leaching was increased for:
Arsenic (As)—by 84%
Chlorine (Cl)—by 43%

EXAMPLE 7

Metallurgy sludge 500 g, caustic magnesium oxide 150 g, sodium hydrogen sulphate 7.5 g, aluminium oxide 1.5 g, water 250 ml.
All components were processed as per Example 1.

| | | Leaching [mg/kg d.m.] | |
|---|---|---|---|
| Parameter | Raw material | Post-process material without aluminium oxide added | Post-process material with aluminium oxide |
| Arsenic (As) | 0.26 | 0.062 | 0.016 |
| Barium (Ba) | 1.542 | 2.08 | 0.05 |
| Chromium (Cr) | 7.24 | <2.79 | <2.79 |
| Molybdenum (MO) | 5.65 | 1.06 | 0.684 |
| Antimony (Sb) | 1.73 | 1.34 | 0.434 |
| Selenium (Se) | 0.029 | <0.05 | <0.05 |
| Zinc (Zn) | 3.71 | <1.86 | <1.86 |
| Chlorides (Cl) | 3030 | 1860 | 863 |
| Fluorides (F) | 62.4 | 6.82 | 3.49 |

The reduction of leaching was increased for:
Arsenic (As)—by 74%
Barium (Ba)—by 98%
Molybdenum (Mo)—by 35.5%
Antimony (Sb)—by 68%
Chlorides (Cl)—by 54%
Fluorides (F)—by 49%

EXAMPLE 8

Dredging spoil 500 g, caustic magnesium oxide 150 g, sodium metasilicate 7.5 g, aluminium oxide 1.5 g, water 150 ml.

All components were processed as per Example 1.

| Parameter | Raw material | Leaching [mg/kg d.m.] | |
|---|---|---|---|
| | | Post-process material without aluminium oxide added | Post-process material with aluminium oxide |
| Barium (Ba) | 126 | 0.46 | 0.186 |
| Chromium (Cr) | 0.49 | <0.03 | <0.03 |
| Copper (Cu) | 1.04 | 1.31 | 0.54 |
| Molybdenum (MO) | 0.62 | <0.1 | <0.1 |
| Nickel (Ni) | 4.5 | 0.35 | 0.267 |
| Antimony (Sb) | 0.35 | <0.1 | <0.1 |
| Zinc (Zn) | 35 | <0.1 | <0.1 |
| Mineral Oil ($C_{10}$-$C_{40}$) | 900 | 178 | 46 |
| Polycyclic aromatic hydrocarbons (PAH) | 19.9 | 8.7 | 2.6 |

The reduction of leaching was increased for:
Barium (Ba)—by 60%
Copper (Cu)—by 59%
Nickel (Ni)—by 24%
Mineral oil ($C_{10}$-$C_{40}$)—by 74%
PAH—by 70%.

EXAMPLE 9

Fly-ash from waste incineration 500 g, caustic magnesium oxide 450 g, sodium hydrogen sulphate 22.5 g, potassium oxide 9 g, water 350 ml.

All components were processed as per Example 1.

| Parameter | Raw material | Leaching [mg/kg d.m.] | |
|---|---|---|---|
| | | Post-process material without Potassium oxide added | Post-process material with potassium oxide |
| Barium (Ba) | 6.49 | 0.98 | <0.50 |
| Cadmium (Cd) | 17.8 | 0.63 | <0.10 |
| Chromium (Cr) | 2.50 | 0.79 | <0.50 |
| Copper (Cu) | 0.659 | <0.30 | <0.30 |
| Mercury (Hg) | 6.40 | 0.49 | <0.005 |
| Molybdenum (Mo) | 3.28 | 0.60 | <0.25 |
| Nickel (Ni) | 3.47 | 2.48 | <0.30 |
| Lead (Pb) | 25.0 | 10.8 | <0.030 |
| Antimony (Sb) | 3.20 | 0.06 | <0.03 |
| Selenium (Se) | 0.032 | 0.19 | 0.14 |
| Zinc (Zn) | 1685 | 0.78 | <0.50 |
| Chlorides (Cl) | 306450 | 66470 | 1003 |
| Sulphates ($SO_4^{2-}$) | 19238 | 2221 | 354 |
| Dissolved organic carbon (DOC) | 172 | 20.0 | 29.0 |

The reduction of leaching was increased for:
Barium (Ba)—by a min. of 49%
Cadmium (Cd)—by a min. of 84%
Chrome (Cr)—by a min. of 37%
Mercury (Hg)—by a min. of 99%
Molybdenum (Mo)—by a min. of 58%
Nickel (Ni)—by a min. of 88%
Lead (Pb)—by a min. of 99.7%
Antimony (Sb)—by a min. of 50%
Selenium (Se)—by 26%
Zinc (Zn)—by a min. of 36%
Chlorides (Cl)—by a min. of 98.5%
Sulphates ($SO_4^{2-}$)—by 84%
TDS—by 98%.

What is claimed is:

1. A composition for binding environmentally-harmful substances, the environmentally-harmful substances comprising noxious substances and being in a solid or semi-liquid state, the composition comprising:
   a caustic magnesium oxide,
   a non-ferrous metal salt, and
   a non-ferrous metal oxide,
wherein
   (a) the non-ferrous metal salt is sodium hydrogen sulfate and the non-ferrous metal oxide is aluminum oxide;
   (b) the non-ferrous metal salt is sodium pyrophosphate and the non-ferrous metal oxide is calcium oxide; or
   (c) the non-ferrous metal salt is sodium hydrogen sulfate and the non-ferrous metal oxide is potassium oxide.

* * * * *